(12) United States Patent
Lwo

(10) Patent No.: US 7,721,276 B2
(45) Date of Patent: May 18, 2010

(54) COMPUTER-IMPLEMENTED METHOD, SYSTEM AND PROGRAM PRODUCT FOR COMPARING APPLICATION PROGRAM INTERFACES (APIS) BETWEEN JAVA BYTE CODE RELEASES

(75) Inventor: Fuhwei Lwo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 10/783,002

(22) Filed: Feb. 20, 2004

(65) Prior Publication Data

US 2005/0188356 A1 Aug. 25, 2005

(51) Int. Cl.
G06F 9/44 (2006.01)
G06F 9/45 (2006.01)
G06F 3/00 (2006.01)

(52) U.S. Cl. .................. 717/166; 717/148; 717/165; 719/328

(58) Field of Classification Search ......... 717/120–123, 717/148, 162–167; 719/328–329
See application file for complete search history.

(56) References Cited

U.S. PATENT DOCUMENTS

| | | | | |
|---|---|---|---|---|
| 6,308,182 | B1* | 10/2001 | Nishigaya et al. | 707/103 R |
| 6,385,722 | B1* | 5/2002 | Connelly et al. | 713/2 |
| 6,415,435 | B1* | 7/2002 | McIntyre | 717/108 |
| 6,430,564 | B1* | 8/2002 | Judge et al. | 707/100 |
| 6,591,417 | B1 | 7/2003 | Strysniewicz et al. | |
| 6,651,186 | B1* | 11/2003 | Schwabe | 714/38 |
| 6,851,111 | B2* | 2/2005 | McGuire et al. | 717/166 |
| 6,986,132 | B1* | 1/2006 | Schwabe | 717/168 |
| 2002/0144018 | A1 | 10/2002 | Knutson et al. | |
| 2003/0028549 | A1 | 2/2003 | Hartel et al. | |
| 2003/0097650 | A1 | 5/2003 | Bahrs et al. | |
| 2003/0110313 | A1 | 6/2003 | Dochez et al. | |
| 2003/0126310 | A1 | 7/2003 | Ryzhov | |
| 2004/0230948 | A1* | 11/2004 | Talwar et al. | 717/114 |

OTHER PUBLICATIONS

Forman et al., "Release-to-Release Binary Compatibility in SOM," 1995, ACM, p. 426-438.*

* cited by examiner

*Primary Examiner*—Ted T Vo
*Assistant Examiner*—Qing Chen
(74) *Attorney, Agent, or Firm*—A. Bruce Clay; Jeanine S. Ray-Yarletts

(57) ABSTRACT

Under the present invention, source input corresponding to a first release of Java byte code and target input corresponding to a second release of the Java byte code is received. The input is transformed into a first list containing class names associated with the first release and a second list containing class names associated with the second release. Thereafter, any classes corresponding to class names that appear on both lists (e.g., matching class names) are loaded. The methods within the matching classes are then compared to determine if any of the APIs have been modified between the two releases. After the comparison, the matching class names are removed from the lists. Any class names remaining on the first list represent APIs that have been removed from the second release, while any class names remaining on the second list represent APIs that have been added for the second release.

24 Claims, 4 Drawing Sheets

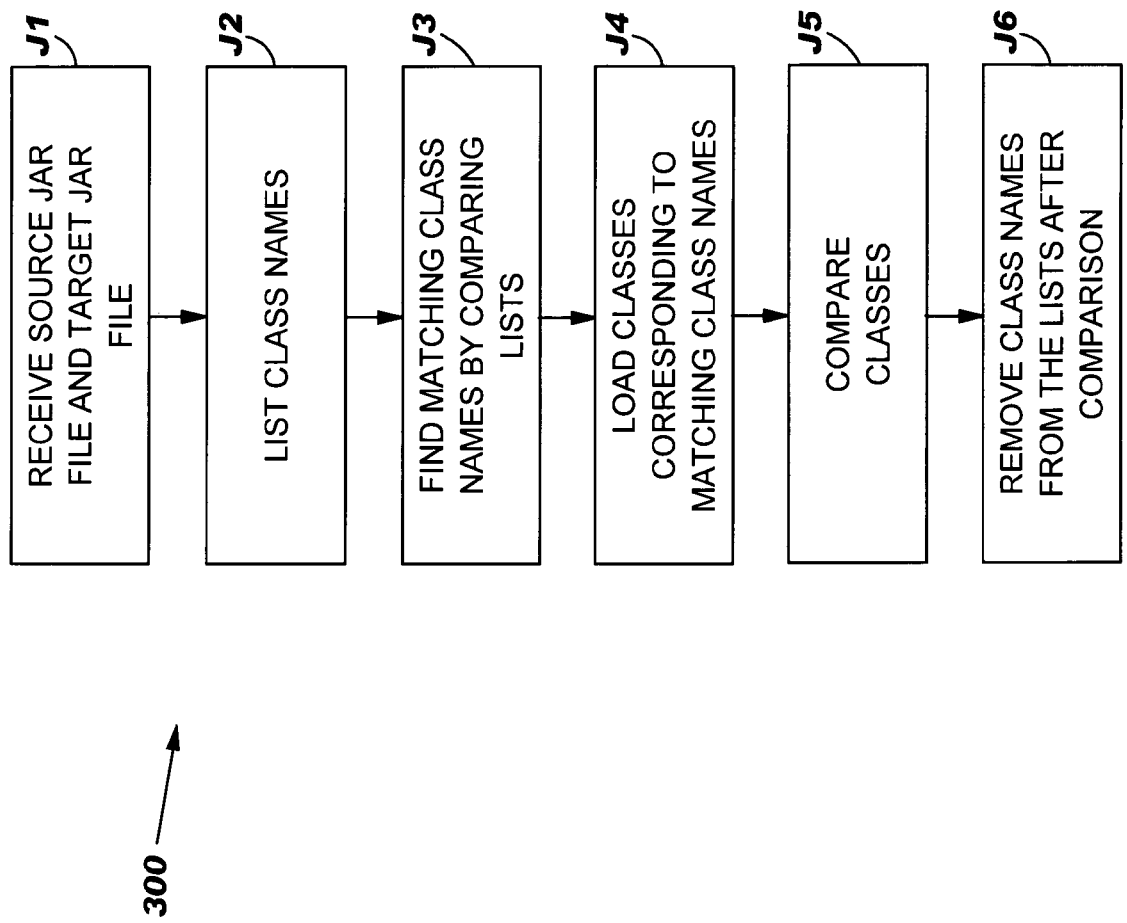

COMPUTER-IMPLEMENTED METHOD, SYSTEM AND PROGRAM PRODUCT FOR COMPARING APPLICATION PROGRAM INTERFACES (APIS) BETWEEN JAVA BYTE CODE RELEASES

BACKGROUND OF THE INVENTION

1. Field of the Invention

In general, the present invention provides a computer-implemented method, system and program product for comparing Application Program Interfaces (APIs) between JAVA byte code releases. Specifically, the present invention provides an accurate and efficient way to determine any API differences between two releases of JAVA byte code.

2. Related Art

As the use of the JAVA (JAVA is a trademark of Sun Microsystems in this country and/or abroad) programming language becomes more prevalent, many new software products are being developed in JAVA. In many instances, a software product will have multiple releases or versions. One major problem with having multiple releases is maintaining backward compatibility so that new releases can support the functionality of previous releases. Between two Software Development Kit (SDK) releases, the problem would be to maintain backward compatibility of Application Program Interfaces (APIs). As known, an API is the specific method by which a programmer writing an application program can make requests of an operating system or another application. In general, an API can be contrasted with a graphical user interface or a command interface (both of which are direct user interfaces) as interfaces to an operating system or a program. When developing APIs, a developer will often use a modeling tool such as the RATIONAL modeling tool (RATIONAL is a trademark of International Business Machines of Armonk, N.Y., in this country and/or abroad), which is commercially available from International Business Machines, Corp. of Armonk, N.Y. RATIONAL allows a developer to define a model using Unified Modeling Language (UML), and automatically generate APIs based thereon.

To date, many solutions have been proposed for determining the difference between two software releases. None of these proposed solutions, however, provides a way to determine the API differences between two releases of JAVA byte code. Specifically, under the JAVA programming language, JAVA code is first developed and then later compiled into binary or byte code (e.g., by a JAVA Virtual Machine), which represents the final "deliverable" to the customer. Existing solutions determine the differences between two releases using the uncompiled JAVA code. This is usually performed either by manually parsing the JAVA code, or by using a utility that references comments inserted by developers during the development process. However, manually determining the differences requires both a great deal of manpower and time. Moreover, relying on developer comments assumes that all necessary comments have been inserted. Since it is very easy for a developer to forget to insert a comment, there is a high likelihood that API differences between releases will go unnoticed. Still yet, because the uncompiled JAVA code does not represent the final "deliverable" to the customer, there is no way to ensure complete accuracy in the analysis.

In view of the foregoing, there exists a need for a computer-implemented method, system and program product for comparing Application Program Interfaces (APIs) between JAVA byte code releases. That is, a need exists for a way to determine the changes made to the APIs of two releases of JAVA byte code. To this extent, a need exists for any classes in common to both releases to be compared to determine if any APIs were modified between the two releases. Still yet, a need exists for classes added to, or removed from the second release (with respect to the first release) to be identified.

SUMMARY OF THE INVENTION

In general, the present invention provides a computer-implemented method, system and program product for comparing Application Program Interfaces (APIs) between JAVA byte code releases. Specifically, under the present invention, source input corresponding to a first release of JAVA byte code and target input corresponding to a second release of the JAVA byte code is received. The input is transformed into a first list containing class names associated with the first release and a second list containing class names associated with the second release. Thereafter, any classes corresponding to class names that appear on both lists (e.g., matching class names) are loaded. The methods within the matching classes are then compared to determine if any of the APIs have been modified between the two releases. After the comparison, the matching class names are removed from the lists. Any class names remaining on the first list represent APIs that have been removed for the second release, while any class names remaining on the second list represent APIs that have been added for the second release.

A first aspect of the present invention provides a computer-implemented method for comparing Application Program Interfaces (APIs) between JAVA byte code releases, comprising: receiving source input corresponding to a first release of JAVA byte code and target input corresponding to a second release of the JAVA byte code; transforming the source input into a first list that contains JAVA class names associated with the first release of JAVA byte code, and the target input into a second list containing JAVA class names associated with the second release of the JAVA byte code; finding matching class names between the first list and the second list, and loading classes corresponding to the matching class names; comparing the loaded classes to identify APIs that have been modified between the first release of JAVA byte code and the second release of the JAVA byte code; and removing the matching class names from the first list and the second list after the comparing, wherein any class names remaining in the first list represent APIs that have been removed for the second release of the JAVA byte code, and wherein any class names remaining in the second list represent APIs that have been added for the second release of the JAVA byte code.

A second aspect of the present invention provides a system for comparing Application Program Interfaces (APIs) between JAVA byte code releases, comprising: an input system for receiving source input corresponding to a first release of JAVA byte code and target input corresponding to a second release of the JAVA byte code; a transformation system for transforming the source input into a first list that contains JAVA class names associated with the first release of JAVA byte code, and the target input into a second list containing JAVA class names associated with the second release of the JAVA byte code; a class matching system for finding matching class names between the first list and the second list; a class comparison system for comparing classes corresponding to the matching class names to identify APIs that have been modified between the first release of JAVA byte code and the second release of the JAVA byte code; and a removal system for removing the matching class names from the first list and the second list after the comparison, wherein any class names remaining in the first list represent APIs that have been removed for the second release of the JAVA byte code, and wherein any class names remaining in the second list represent APIs that have been added for the second release of the JAVA byte code.

A third aspect of the present invention provides a program product stored on a recordable medium for comparing Application Program Interfaces (APIs) between JAVA byte code releases, which when executed, comprises: program code for receiving source input corresponding to a first release of JAVA byte code and target input corresponding to a second release of the JAVA byte code; program code for transforming the source input into a first list that contains JAVA class names associated with the first release of JAVA byte code, and the target input into a second list containing JAVA class names associated with the second release of the JAVA byte code; program code for finding matching class names between the first list and the second list; program code for comparing classes corresponding to the matching class names to identify APIs that have been modified between the first release of JAVA byte code and the second release of the JAVA byte code; and program code for removing the matching class names from the first list and the second list after the comparison, wherein any class names remaining in the first list represent APIs that have been removed for the second release of the JAVA byte code, and wherein any class names remaining in the second list represent APIs that have been added for the second release of the JAVA byte code.

Therefore, the present invention provides a computer-implemented method, system and program product for comparing Application Program Interfaces (APIs) between JAVA byte code releases.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a flow diagram of a second illustrative method for comparing APIs according to the present invention.

Figure 1:
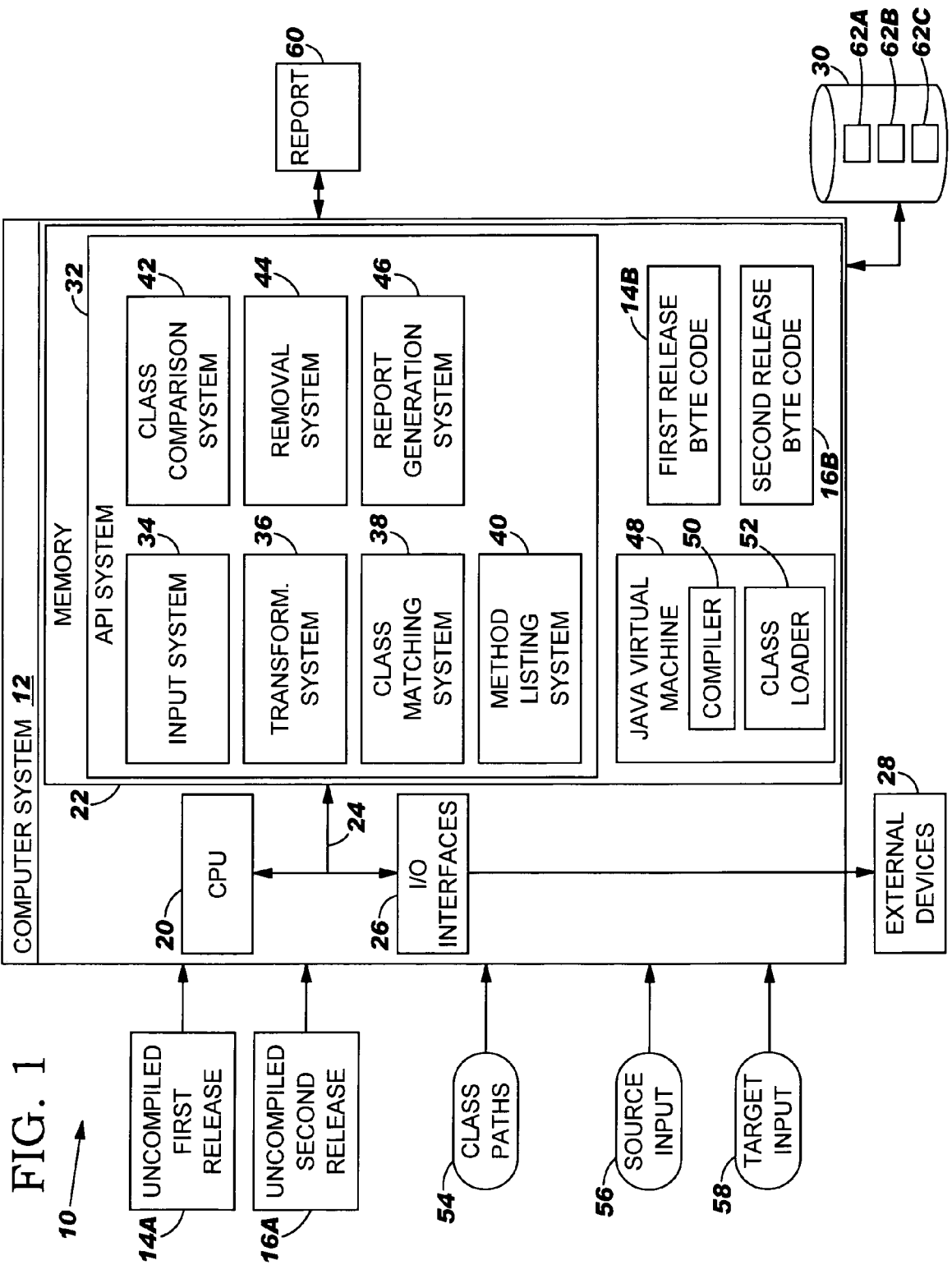
FIG. 1 depicts an illustrative system for comparing Application Program Interfaces (APIs) between JAVA byte code releases according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes, the Detailed Description of the Drawings will have the following Sections:

I. General Description
II. Definitions
III. Computerized Implementation

I. General Description

As indicated above, the present invention provides a computer-implemented method, system and program product for comparing Application Program Interfaces (APIs) between JAVA byte code releases. Specifically, under the present invention, source input corresponding to a first release of JAVA byte code and target input corresponding to a second release of the JAVA byte code is received. The input is transformed into a first list containing class names associated with the first release and a second list containing class names associated with the second release. Thereafter, any classes corresponding to class names that appear on both lists (e.g., matching class names) are loaded. The methods within the matching classes are then compared to determine if any of the APIs have been modified between the two releases. After the comparison, the matching class names are removed from the lists. Any class names remaining on the first list represent APIs that have been removed for the second release, while any class names remaining on the second list represent APIs that have been added for the second release.

II. Definitions

The details of the JAVA programming language are well known to those of ordinary skill in the art and will not be described in detail herein. However, for clarity purposes, the following terms have the following meanings:

A "class" is a template definition of the methods and variables in a particular kind of object. An object is a specific instance of a class that contains real values instead of variables. To this extent, a class can have subclasses that can inherit all or some of the characteristic of the class.

A "method" is a programmed procedure that is defined as part of a class and included in any object of that class. A class can have more than one method, and as single method, can be reused in multiple objects.

A "JAVA Archive file (JAR file)" is a file that contains the class(es), image(s) and sound file(s) for a JAVA program gathered into a single file.

A "JAVA Virtual Machine (JVM)" (JVM is a trademark of Sun Microsystems in this country and/or abroad) is an implementation of the JAVA Virtual Machine Specification that compiles JAVA code into byte code or binary code and interprets the compiled code for a computer's processor so that it can perform a JAVA program's instructions. JAVA was designed to allow application programs to be built that could be run on any platform without having to be rewritten or recompiled by the programmer for each separate platform. A JAVA virtual machine makes this possible because it is aware of the specific instruction lengths and other particularities of the platform.

III. Computerized Implementation

Referring now to FIG. 1, a system 10 for comparing APIs of JAVA byte code releases is shown. As depicted, system 10 includes computer system 12, which generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, handheld device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., database) capable of providing storage for information under the present invention. Such information could include, for example, lists 62A-C, byte code releases, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 is API system 32 (shown as a program product). As will be further described below, API system 32 facilitates the comparison of APIs between first release of (JAVA) byte code 14B and second release of (JAVA) byte code 16B. Specifically, under the present invention, a developer or the like (not shown) will provide uncompiled first release of JAVA code 14A and uncompiled second release of JAVA code 16A to computer system 12. As known in the art, compiler 50 within JAVA Virtual Machine 48 will compile the uncompiled releases 14A and 16A into compiled releases of byte code 14B and 16B, respectively. It should be understood that first release 14A-B and second release 16A-B are intended to be subsequent releases of the same software program. Moreover, it should be understood that JAVA Virtual Machine 48 will likely include other components not shown in FIG. 1. Such components should be understood to exist by those of ordinary skill in the art. In any event, once compiled into first and second releases of byte code 14B and 16B, API system 32 can make an API comparison there between.

As depicted, API system 32 includes input system 34, transformation system 36, class matching system 38, method listing system 40, class comparison system 42, removal system 44 and report generation system 46. It should be understood that each of these systems includes program code/logic for carrying out the functions described herein. Moreover, it should be understood that API system 32 could reside within an existing modeling tool such as Rational (as discussed above). To this extent, the present invention could be embodied as a modification to any modeling tool now know or later developed. Regardless, for the comparison to be performed under the present invention, the developer will provide some basic input. To this extent, as shown, the developer will first provide common class paths for uncompiled first release 14A and uncompiled second release 16A of Java code. Specifically, it could be the case that a class within the releases 14A and/or 16A references another class outside of the releases 14A and/or 16A. Providing the common class paths 54 ensures that such classes can be located. The developer will also provide source input 56 corresponding to uncompiled first release 14A and target input 58 corresponding to uncompiled second release 16A. Source input 56 and target input 58 can be a list of classes, one or more JAR files, or the like. In any event, the class paths 54, source input 56 and target input 58 will be received by input system 34 (and possibly stored in storage unit 30).

Upon receipt, transformation system 36 will transform source input 56 and target input 58 into two lists 62A-B of JAVA class names along with their loading information. Specifically, transformation system 36 will transform source input 56 into a first list 62A of class names and target input 58 into a second list 62B of class names. Once listed in this manner, class matching system 38 will attempt to find class names that appear on both lists 62A-B (i.e., matching class names). Assume, for example, that class matching system 38 found one class name (e.g., class name "X") that appeared on both lists 62A-B. In this event, class loader 52 within JAVA Virtual Machine 48 would then load the classes corresponding thereto from first release of byte code 14B and second release of byte code 16B. So for example, class loader 52 might load classes "A," "B," and "C" from each release of byte code 14B and 16B. Once loaded, method listing system 40 will list the methods of the loaded classes on first list 62A and second list 62B, respectively (or on other lists not shown).

At this point, the loaded classes will be compared by class comparison system 42. Specifically, the methods of the loaded classes of first release of byte code 14B will be compared to the corresponding methods of the loaded classes of second release of byte code 16B to determine if any APIs have been modified between first release of byte code 14B and second release of byte code 16B. For example, if the methods of class "A" differed between first release of byte code 14B and second release of byte code 16B, then the API(s) associated with class "A" would be determined to have been modified. In general, a method is considered the same between the two releases if it maintains the same name, parameter order and types, and return types. If any of these elements differ between the two releases, then the method and class is determined to be different and the resulting API(s) modified. In such a case, an entry identifying the modified classes and/or APIs can be made on a "modified API" list 62C. After the comparison is made, the compared methods and the class name corresponding thereto (e.g., class name "X") will be removed from both lists 62A-B. The process would then be repeated for any other matching class names (although in this example only one class name appeared on both lists 62A-B). Once all matching class names have undergone the comparison process and been removed from lists 62A-B, it can be determined whether API(s) have been added or removed between first release of byte code 14B and second release of byte code 16B. Specifically, any class names remaining in first list 62A will not be present in second list 62B, and therefore represent APIs that have been removed for second release of byte code 16B. Conversely, any class names remaining in second list 62B will not be present in first list 62A, and therefore represent APIs that have been added for second release of byte code 16B. Once the added, removed and/or modified APIs have been identified, report generation system 46 can generate and output a report 60 of the results. Under the present invention, report generation system 46 has the capability to filter the results so that only selected results are outputted. For example, a developer might only desire to see the APIs that have been modified. Accordingly, the report 60 can identify at least one of the added APIs, the removed APIs and/or the modified APIs.

Figure 2:
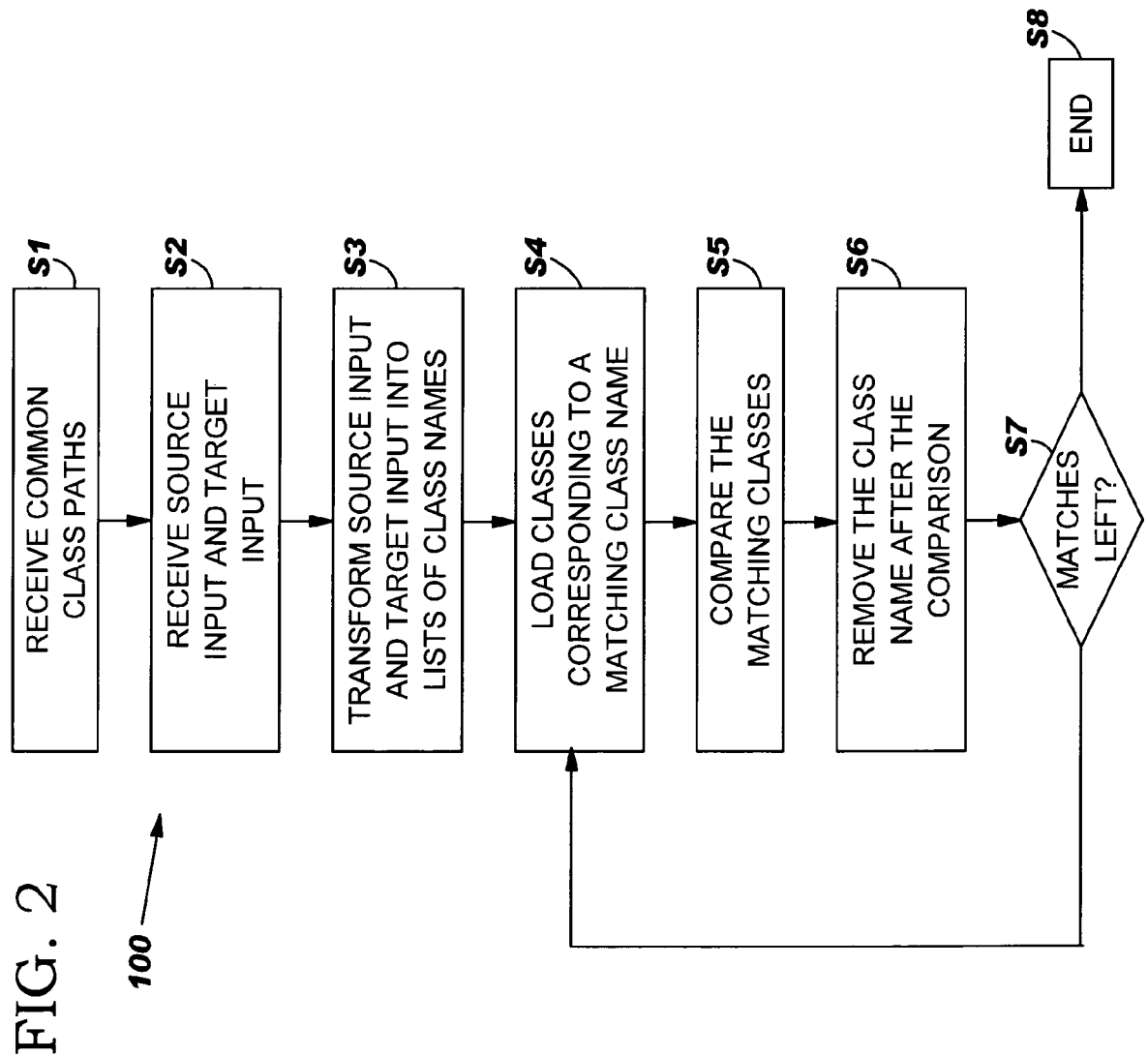
FIG. 2 depicts a flow diagram of a first illustrative method for comparing APIs according to the present invention.
Figure 3:
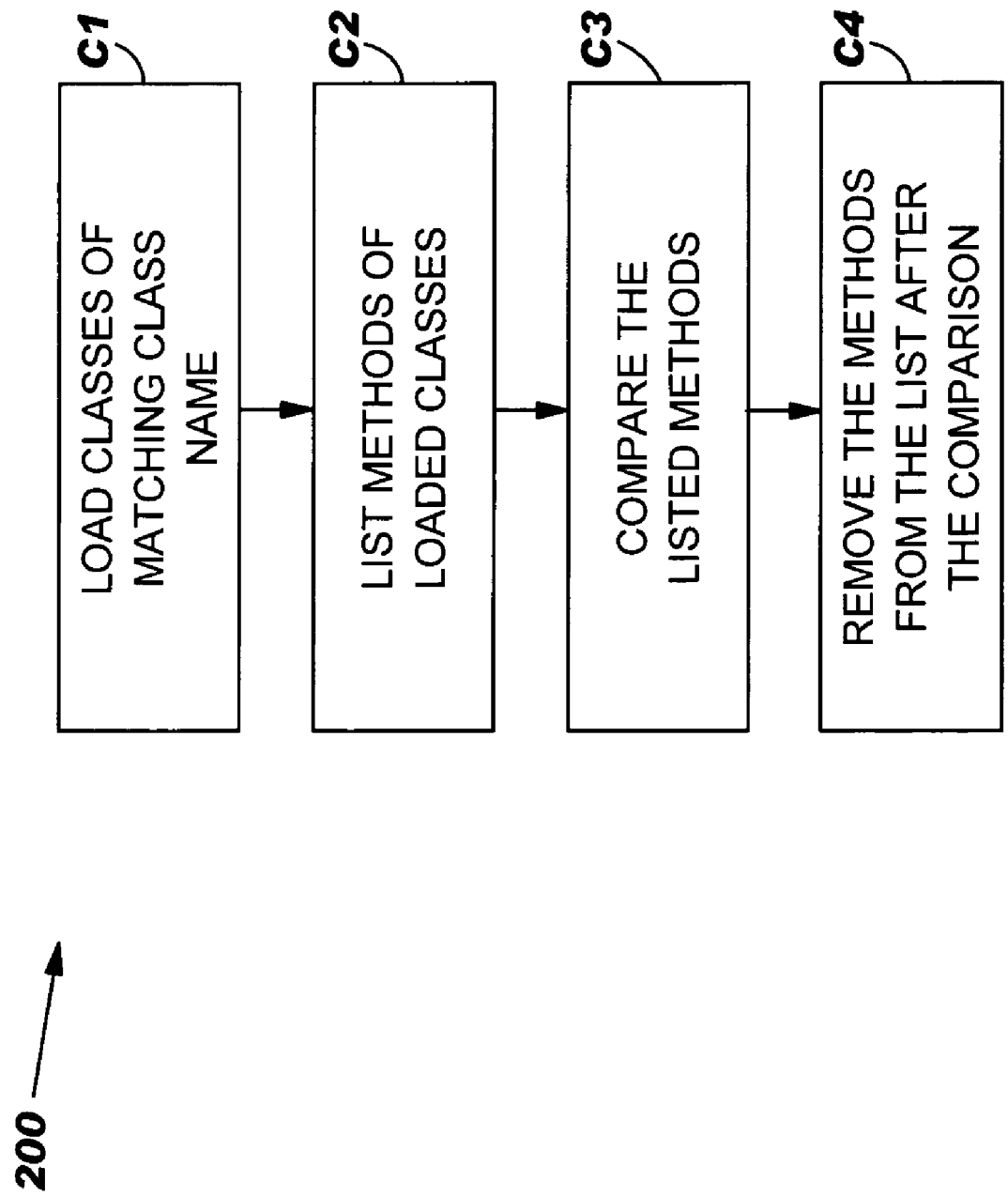
FIG. 3 depicts a flow diagram of an illustrative method for comparing JAVA classes according to the present invention.

Referring to FIGS. 2-4, flow diagrams are depicted to further describe the teachings of the present invention. Specifically, referring first to FIG. 2, the method as described above is depicted. As shown, first step S1 of method 100 is to receive common class paths. Second step S2 is to receive the source input corresponding to the first release of byte code and the target input corresponding to the second release of byte code. As indicated above, the input can be a list of classes, one or more JAR files or the like. In step S3, the source input and the target input are transformed into a first and second list of class names associated with the first and second releases of byte code, respectively. In step S4, the classes corresponding to any matching class names (i.e., class names that exist in both lists) are loaded. Once loaded the classes are compared in step S5.

Referring briefly to FIG. 3, the comparison operation of step S5 is shown in greater detail. Specifically, first step C1 of comparison method 200 is to load the classes of the matching class name. Second step C2 is to list the methods of the loaded classes. Third step C3 is to compare the listed methods. Fourth step C4 is to then remove the methods from the lists after the comparison.

Returning back to FIG. 2, once the comparison method 200 of FIG. 3 has been completed, the class name corresponding to the classes compared in step S5 will be removed from the first and second lists in step S6. In step S7 it is determined if any other matching class names remain. If so, the process is repeated from step S4 for the next matching class name. If not, the process will be ended in step S8.

It should be appreciated that the present invention need not be limited to the source input and target input being a list of classes. For example, referring to FIG. 4, a method 300 is depicted whereby the source input and the target input comprises one or more JAR files. Specifically, as shown, step J1 is to receive at least one source JAR file and at least one target JAR file. In step J2, the input JAR files will be transformed into two lists of class names (as indicated in FIG. 2). In step J3, matching class names will be identified from the lists, and in step J4, the classes corresponding to the matching class names will be loaded. In step J5, the classes will be compared as described in conjunction with FIG. 3 After the comparison, the matching class name will be removed from the lists in step J6. Similar to method 100 of FIG. 2, the process will be repeated for all matching class names. Once all matching class names have been removed from the lists, the process can end.

It should be understood that the teachings described herein could be implemented on a stand-alone computer system 12 as shown in FIG. 1, or over a network in a client-server environment. In the case of the latter, the client and server could communicate over any type of network such as the Internet, a local area network (LAN), a wide area network (WAN), a virtual private network (VPN), etc. As such, communication between the client and server could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the client could utilize an Internet service provider to establish connectivity to the server.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of API system 32 shown in FIG. 1 is not intended to be limiting. That is, the functions of the present invention described herein could be represented by a different configuration of systems.

I claim:

1. A computer-implemented method for comparing Application Program Interfaces (APIs) between byte code releases, comprising:

inputting class paths common to a first release of byte code and a second release of byte code;

receiving a source input corresponding to the first release of the byte code and a target input corresponding to the second release of the byte code;

transforming the source input into a first list that contains class names associated with the first release of the byte code, and the target input into a second list containing class names associated with the second release of the byte code;

finding matching class names between the first list and the second list;

loading only classes corresponding to the matching class names;

comparing the loaded classes corresponding to the matching class names to identify APIs that have been modified between the first release of the byte code and the second release of the byte code, wherein an API has not been modified in case that it maintains a same name, parameter order, parameter types and return types in both the first release of the byte code and the second release of the byte code; and removing the matching class names from the first list and the second list after the comparing, wherein any class names remaining in the first list represent APIs that have been removed for the second release of the byte code, and wherein any class names remaining in the second list represent APIs that have been added for the second release of the byte code.

2. The computer-implemented method of claim 1, further comprising outputting a report identifying at least one of the APIs that have been modified, the APIs that have been removed and the APIs that have been added.

3. The computer-implemented method of claim 1, wherein the loading step comprises loading at least one class of the first release of the byte code and at least one class of the second release of the byte code.

4. The computer-implemented method of claim 3, further comprising listing methods of the at least one class of the first release of the byte code in the first list, and listing methods of the at least one class of the second release of the byte code in the second list.

5. The computer-implemented method of claim 4, wherein the comparing step comprises comparing the methods in the first list to the methods in the second list to identify APIs that have been modified between the first release of the byte code and the second release of the byte code.

6. The computer-implemented method of claim 5, wherein the removing step comprises removing, from the first list and the second list, any methods in the first list that are identical to methods in the second list based on the comparison, wherein any methods remaining in the first list after the removing represent APIs that have been removed for the second release of the byte code, and wherein any methods remaining in the second list after the removing represent APIs that have been added for the second release of the byte code.

7. The computer-implemented method of claim 1, wherein the source input and the target input comprise JAR files.

8. The computer-implemented method of claim 1, wherein the source input and the target input comprise a list of classes.

9. A system for comparing Application Program Interfaces (APIs) between byte code releases, comprising:
a computer device;
an input system for receiving class paths common to a first release of byte code and a second release of byte code and receiving a source input corresponding to the first release of the byte code and a target input corresponding to the second release of the byte code;
a transformation system for transforming the source input into a first list that contains class names associated with the first release of the byte code, and the target input into a second list containing class names associated with the second release of the byte code;
a class matching system for finding matching class names between the first list and the second list;
a class loader for loading only classes corresponding to the matching class names;
a class comparison system for comparing the loaded classes corresponding to the matching class names to identify APIs that have been modified between the first release of the byte code and the second release of the byte code, wherein an API has not been modified in case that it maintains a same name, parameter order, parameter types and return types in both the first release of the byte code and the second release of the byte code; and
a removal system for removing the matching class names from the first list and the second list after the comparison, wherein any class names remaining in the first list represent APIs that have been removed for the second release of the byte code, and wherein any class names remaining in the second list represent APIs that have been added for the second release of the byte code.

10. The system of claim 9, further comprising a report generation system for generating a report identifying at least one of the APIs that have been modified, the APIs that have been removed and the APIs that have been added.

11. The system of claim 9, wherein the class loader loads at least one class of the first release of the byte code and at least one class of the second release of the byte code.

12. The system of claim 11, further comprising a method listing system for listing methods of the at least one class of the first release of the byte code in the first list, and for listing methods of the at least one class of the second release of the byte code in the second list.

13. The system of claim 12, wherein the class comparison system compares the methods in the first list to the methods in the second list to identify APIs that have been modified between the first release of the byte code and the second release of the byte code.

14. The system of claim 13, wherein the removal system removes, from the first list and the second list, any methods in the first list that are identical to methods in the second list based on the comparison, wherein any methods remaining in the first list after the removing represent APIs that have been removed for the second release of the byte code, and wherein any methods remaining in the second list after the removing represent APIs that have been added for the second release of the byte code.

15. The system of claim 9, wherein the source input and the target input comprise JAR files.

16. The system of claim 9, wherein the source input and the target input comprise a list of classes.

17. A program product stored on a recordable medium for comparing Application Program Interfaces (APIs) between byte code releases, which when executed by a processor, comprises:
program code for receiving class paths common to a first release of byte code and a second release of byte code and receiving a source input corresponding to the first release of the byte code and a target input corresponding to the second release of the byte code;
program code for transforming the source input into a first list that contains class names associated with the first release of the byte code, and the target input into a second list containing class names associated with the second release of the byte code;
program code for finding matching class names between the first list and the second list;
program code for loading only classes corresponding to the matching class names;
program code for comparing the loaded classes corresponding to the matching class names to identify APIs that have been modified between the first release of the byte code and the second release of the byte code, wherein an API has not been modified in case that it maintains a same name, parameter order, parameter types and return types in both the first release of the byte code and the second release of the byte code; and
program code for removing the matching class names from the first list and the second list after the comparison, wherein any class names remaining in the first list represent APIs that have been removed for the second release of the byte code, and wherein any class names remaining in the second list represent APIs that have been added for the second release of the byte code.

18. The program product of claim 17, further comprising program code for generating a report identifying at least one of the APIs that have been modified, the APIs that have been removed and the APIs that have been added.

19. The program product of claim 17, further comprising wherein the program code for loading loads at least one class of the first release of the byte code and at least one class of the second release of the byte code.

20. The program product of claim 19, further comprising program code for listing methods of the at least one class of the first release of the byte code in the first list, and for listing methods of the at least one class of the second release of the byte code in the second list.

21. The program product of claim 20, wherein the program code for comparing compares the methods in the first list to the methods in the second list to identify APIs that have been modified between the first release of the byte code and the second release of the byte code.

22. The program product of claim 21, wherein the program code for removing removes, from the first list and the second list, any methods in the first list that are identical to methods in the second list based on the comparison, wherein any methods remaining in the first list after the removing represent APIs that have been removed for the second release of the byte code, and wherein any methods remaining in the second list after the removing represent APIs that have been added for the second release of the byte code.

23. The program product of claim 17, wherein the source input and the target input comprise JAR files.

24. The program product of claim 17, wherein the source input and the target input comprise a list of classes.

* * * * *